(12) United States Patent
Li (10) Patent No.: US 10,820,208 B2
(45) Date of Patent: Oct. 27, 2020

(54) SOUNDING REFERENCE SIGNAL SCHEDULING METHOD, SOUNDING REFERENCE SIGNAL SENDING METHOD, AND APPARATUSES THEREOF

(71) Applicant: Beijing Zhigu Tech Co., Ltd., Beijing (CN)

(72) Inventor: Yong Li, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 50 days.

(21) Appl. No.: 15/234,044

(22) Filed: Aug. 11, 2016

(65) Prior Publication Data

US 2017/0064558 A1 Mar. 2, 2017

(30) Foreign Application Priority Data

Aug. 31, 2015 (CN) .......................... 2015 1 0548616

(51) Int. Cl.
*H04W 16/14* (2009.01)
*H04L 5/00* (2006.01)
*H04L 27/00* (2006.01)

(52) U.S. Cl.
CPC ............ *H04W 16/14* (2013.01); *H04L 5/005* (2013.01); *H04L 5/0078* (2013.01); *H04L 27/0006* (2013.01)

(58) Field of Classification Search
CPC .............. H04W 16/14; H04W 72/0453; H04L 27/0006; H04L 5/0078; H04L 5/005; H04L 5/0053; H04L 5/0007
See application file for complete search history.

(56) References Cited

U.S. PATENT DOCUMENTS

2015/0049715 A1\* 2/2015 Yerramalli ............ H04L 5/1469
370/329
2015/0098397 A1\* 4/2015 Damnjanovic ....... H04W 74/08
370/329

(Continued)

FOREIGN PATENT DOCUMENTS

CN 102223712 A 10/2011
CN 102316513 A 1/2012
(Continued)

*Primary Examiner* — Gregory B Sefcheck
*Assistant Examiner* — Joshua Smith
(74) *Attorney, Agent, or Firm* — Sheppard Mullin Richter & Hampton LLP (57) ABSTRACT

Embodiments of this application disclose a sounding reference signal scheduling method, a sounding reference signal sending method, and apparatuses thereof. The sounding reference signal scheduling method comprises: determining an available carrier in an unlicensed spectrum; and in response to the existing available carrier, sending, at least on the available carrier, a physical indication signal, wherein the physical indication signal comprises information related to scheduling of a sounding reference signal of at least one user equipment, and the physical indication signal is used at least to trigger the at least one user equipment to send a sounding reference signal. According to the methods and apparatuses in the embodiments of this application, scheduling information is placed in a physical indication signal that occupies an available carrier; therefore, a sounding reference signal can be scheduled more flexibly.

6 Claims, 3 Drawing Sheets

(56) References Cited

U.S. PATENT DOCUMENTS

| | | | | |
|---|---|---|---|---|
| 2015/0146680 A1* | 5/2015 | Luo | H04W 72/0446 | 370/330 |
| 2015/0156756 A1* | 6/2015 | Zhang | H04W 68/00 | 370/329 |
| 2015/0163036 A1* | 6/2015 | Thomas | H04L 5/0007 | 370/281 |
| 2015/0230063 A1* | 8/2015 | Chandramouli | H04W 4/005 | 455/466 |
| 2015/0289208 A1* | 10/2015 | Liu | H04W 52/0229 | 370/252 |
| 2016/0100397 A1* | 4/2016 | Wen | H04W 72/1284 | 370/329 |
| 2016/0164652 A1* | 6/2016 | Huang | H04W 74/0816 | 370/329 |
| 2016/0295526 A1* | 10/2016 | Park | H04W 52/325 | |
| 2017/0086211 A1* | 3/2017 | Sahin | H04W 74/04 | |
| 2017/0118728 A1* | 4/2017 | Harada | H04W 52/38 | |
| 2017/0141859 A1* | 5/2017 | Seo | H04W 24/08 | |
| 2017/0141893 A1* | 5/2017 | Zhang | H04L 5/0048 | |
| 2017/0215172 A1* | 7/2017 | Yang | H04W 72/0446 | |
| 2017/0238190 A1* | 8/2017 | Yang | H04W 16/14 | 370/329 |
| 2017/0280331 A1* | 9/2017 | Gou | H04W 16/14 | |
| 2017/0339696 A1* | 11/2017 | Xu | H04W 72/0453 | |
| 2017/0353866 A1* | 12/2017 | Gou | H04W 16/14 | |

FOREIGN PATENT DOCUMENTS

| | | |
|---|---|---|
| CN | 104507108 A | 4/2015 |
| CN | 104735729 A | 6/2015 |

\* cited by examiner

SOUNDING REFERENCE SIGNAL SCHEDULING METHOD, SOUNDING REFERENCE SIGNAL SENDING METHOD, AND APPARATUSES THEREOF

TECHNICAL FIELD

This application relates to the field of communications technologies, and in particular, to a sounding reference signal scheduling method, a sounding reference signal sending method, and apparatuses thereof.

BACKGROUND

A licensed spectrum is a wireless spectrum that is granted for use by an operator as stipulated in laws of each country, and can be used only when a license is possessed and network entry test is passed. An unlicensed spectrum can be used without authorization by the government, and is, for example, a frequency band in which WiFi and Bluetooth devices and the like operate. Because licensed spectrum resources allocated for mobile communication are scarce, a future development scale of mobile communications networks is constrained. Currently, it is being considered that licensed spectrums and a large number of unlicensed spectrums are combined, to improve transmission capacity of mobile networks. According to statistics, currently, in a frequency band of 5 GHz, total unlicensed spectrum resources already allocated by countries in the world may exceed 500 MHz, and these unlicensed Wi-Fi spectrums are targeted by mobile communications equipment vendors, mobile network operators, and the like; therefore, solutions such as LTE-U (Unlicensed LTE, unlicensed frequency band LTE) are derived, and it has been announced recently that a test program of an unlicensed frequency band LTE technology will be launched. A license assisted access (License Assisted Access, LAA) technology that is being actively studied by 3GPP as an international organization for standardization is a typical solution that seeks to extend capacity of a mobile communications system by using an unlicensed spectrum, and further improves transmission capacity of LTE systems by allowing LTE systems to use an unlicensed spectrum.

Currently, a link adaptation technology is widely used in mobile communications systems, that is, a transmit end dynamically adjusts, according to a current state of a channel between a receiving node and a sending node, a sending format or parameter of a radio signal that comprises a channel resource, modulation and coding formats, a data block size, and the like, to improve transmission capacity or reliability of a radio link. To conveniently obtain a state of a channel between a receiving node and a sending node, according to a common method, a transmit end sends a sounding signal to a receive end, to cause that the receive end can estimate a current channel state according to the sounding signal.

For example, for uplink transmission of an LTE system, the foregoing method of obtaining a channel state by using a sounding signal is used. Specifically, a base station configures that user equipment (UE) sends, for example, in last OFDM symbols (symbol) of some subframes, a physical-layer signal that is referred to as a sounding reference signal (Sounding Reference Signal, SRS), to obtain estimation of a channel state, and determines on this basis a physical channel resource and a corresponding sending format that are used in transmission by the user equipment and that are comprised in scheduling signaling.

Similar to traditional sending of an SRS in a licensed spectrum, sending of an SRS in an unlicensed spectrum similarly plays an important role in improving scheduling performance. However, a serious problem that challenges sending of an SRS in an unlicensed spectrum is: because multiple systems share an unlicensed spectrum resource, when an LAA user equipment sends an SRS, a carrier resource may be occupied by another system, and consequently, the LAA user equipment cannot send an SRS, and in this case, if a base station side attempts to receive an SRS, a channel state of the user equipment is wrongly estimated. Moreover, in an LAA system, a non-cycle SRS mechanism is usually used, and is dynamically activated by a base station; and once the mechanism is activated, a terminal device does not periodically send an SRS, and instead, sends an SRS only once. In this case, a base station may trigger user equipment to send a non-cycle SRS by using, for example, several bits in uplink scheduling signaling (UL Grant) or downlink scheduling signaling (DL Grant), and an SRS configuration parameter is indicated by using higher layer signaling. However, this triggering manner can be applied to trigger only user equipment that will be scheduled to transmit data, to send an SRS signal, and for user equipment that does not need to transmit data for a relatively long time or that is not scheduled for a relatively long time, a channel state of the user equipment cannot be known by triggering the user equipment to send an SRS. That is, the traditional manner of triggering sending of an SRS by using scheduling signaling is inflexible for an LAA system.

SUMMARY

In view of this, an objective of the embodiments of this application is to provide a flexible sounding reference signal scheduling solution.

To achieve the foregoing objective, according to a first aspect of the embodiments of this application, a sounding reference signal scheduling method is provided, wherein the method comprises:

determining an available carrier in an unlicensed spectrum; and in response to the existing available carrier, sending, at least on the available carrier, a physical indication signal, wherein the physical indication signal comprises information related to scheduling of a sounding reference signal of at least one user equipment, and the physical indication signal is used at least to trigger the at least one user equipment to send the sounding reference signal.

According to a second aspect of the embodiments of this application, a method for a user equipment to send a sounding reference signal is provided, wherein the method comprises:

listening for a physical indication signal related to an unlicensed spectrum; and in response to the information related to scheduling of the sounding reference signal of the user equipment that is comprised in the physical indication signal obtained by means of listening, sending a sounding reference signal at least according to the information, wherein the physical indication signal is used at least to trigger the user equipment to send the sounding reference signal.

According to a third aspect of this application, a sounding reference signal scheduling apparatus is provided, wherein the apparatus comprises:

a first determining module, configured to determine an available carrier in an unlicensed spectrum; and a first sending module, configured to: in response to the existing available carrier, send, at least on the available carrier, a physical indication signal, wherein the physical indication signal comprises information related to scheduling of a sounding reference signal of at least one user equipment, and the physical indication signal is used at least to trigger the at least one user equipment to send the sounding reference signal.

According to a fourth aspect of this application, an apparatus for a user equipment to send a sounding reference signal is provided, wherein the apparatus comprises:

a listening module, configured to listen for a physical indication signal related to an unlicensed spectrum; and a third sending module, configured to: in response to the information related to scheduling of the sounding reference signal of the user equipment that is comprised in the physical indication signal obtained by means of listening, sending a sounding reference signal at least according to the information, wherein the physical indication signal is used at least to trigger the user equipment to send the sounding reference signal.

According to a fifth aspect of this application, a sounding reference signal scheduling apparatus is provided, wherein the apparatus comprises:

a transceiver;

a memory, configured to store an instruction; and a processor, configured to execute the instruction stored by the memory, wherein the instruction enables the processor to perform the following steps:

determining an available carrier in an unlicensed spectrum; and in response to the existing available carrier, sending, at least on the available carrier, a physical indication signal by using the transmitter, wherein the physical indication signal comprises information related to scheduling of a sounding reference signal of at least one user equipment, and the physical indication signal is used at least to trigger the at least one user equipment to send the sounding reference signal.

According to a sixth aspect of this application, an apparatus for a user equipment to send a sounding reference signal is provided, wherein the apparatus comprises:

a transceiver;

a memory, configured to store an instruction; and a processor, configured to execute the instruction stored by the memory, wherein the instruction enables the processor to perform the following steps:

listening for a physical indication signal related to an unlicensed spectrum; and in response to the information related to scheduling of the sounding reference signal of the user equipment that is comprised in the physical indication signal obtained by means of listening, sending a sounding reference signal at least according to the information by using the transceiver, wherein the physical indication signal is used at least to trigger the user equipment to send the sounding reference signal.

According to the methods and apparatuses in the embodiments of this application, scheduling information is placed in a physical indication signal that occupies an available carrier; therefore, a sounding reference signal can be scheduled more flexibly.

BRIEF DESCRIPTION OF THE DRAWINGS

FIG. 3 (a) and FIG. 3 (b) are structural block diagrams of multiple exemplary sounding reference signal scheduling apparatuses according to an embodiment of this application;

DETAILED DESCRIPTION

Specific implementation manners of the present invention are further described in detail with reference to accompanying drawings and embodiments. The following embodiments are used to describe the present invention, but are not intended to limit the scope of the present invention.

A person skilled in the art may understand that terminologies such as "first" and "second" in this application are used only to distinguish different devices, modules, parameters, and the like; and indicates neither a particular technical meaning nor an inevitable logical sequence.

Figure 1:
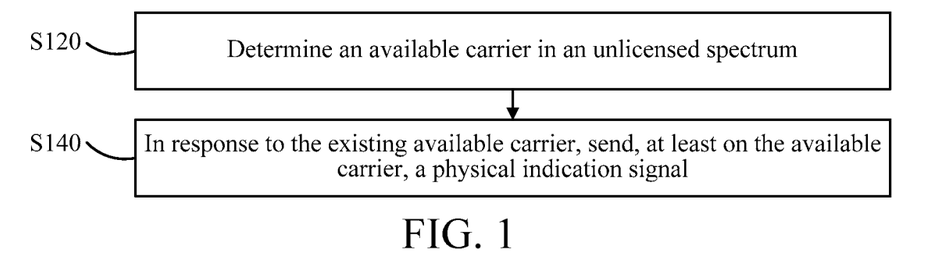
FIG. 1 is an exemplary flowchart of a sounding reference signal scheduling method according to an embodiment of this application.

FIG. 1 is an exemplary flowchart of a sounding reference signal scheduling method according to an embodiment of this application. The method may be executed by a base station. As shown in FIG. 1, the method comprises:

S120. Determine an available carrier in an unlicensed spectrum.

S140. In response to the existing available carrier, send, at least on the available carrier, a physical indication signal, wherein the physical indication signal comprises information related to scheduling of a sounding reference signal of at least one user equipment, and the physical indication signal is used at least to trigger the at least one user equipment to send the sounding reference signal.

In an LAA system, because an unlicensed spectrum is shared between multiple systems, to enable the systems to have an opportunity of fairly accessing the unlicensed spectrum, a traditional contention mechanism is usually used to determine use of the unlicensed spectrum. For example, for uplink scheduling in an LAA system, a common implementation method is: a base station first schedules some user equipments at a scheduling moment, determines, in scheduling signaling (UL Grant), information such as a time-frequency resource to be occupied by a user equipment and a transmission format, and instructs the user equipment to prepare for uplink transmission; after several frames, the base station determines a busy/idle channel status by means of, for example, clear channel assessment (Clear Channel Assessment, CCA), and when a channel is idle, the base station sends a physical indication signal of a particular type (for example, a reservation signal, Reservation Signal) to occupy the idle channel, and notifies the user equipment that the current channel is available. At a subsequent transmission moment, the user equipment performs uplink transmission according to the time-frequency resource and the transmission format that are previously indicated by the base station.

Usually, the physical indication signal is used only to occupy the available carrier, and may comprise no information, but in the scheduling method in this embodiment of this application, information related to scheduling of an SRS of at least one user equipment is placed in the physical indication signal, and the physical indication signal is used at least to trigger the at least one user equipment to send an SRS.

Each user equipment in an LAA system may listen for, in a particular frequency band, a possible physical indication signal (for example, a reservation signal), and according to different configurations of an LAA system, the particular frequency band may be all frequency bands or some frequency bands of one or more carriers in an unlicensed spectrum, and may have been configured for the user equipment by using higher layer signaling (for example, RRC (Radio Resource Control, Radio Resource Control) signaling). In other words, in the scheduling method of this embodiment, information related to SRS scheduling is placed in a physical indication signal, to cause that the physical indication signal can be received by multiple user equipments that listen for a corresponding carrier resource. Therefore, user equipments not only comprise user equipments to be scheduled to perform uplink transmission, but also comprise user equipments that have never been scheduled or have not been scheduled for a relatively long period, and in this way, the base station that performs SRS scheduling according to the method in this embodiment can trigger at a time multiple user equipments to send SRSs to know channel states of these user equipments, that is, SRS scheduling is performed more flexibly according to the method in this embodiment of this application.

In a possible implementation manner, a transmission parameter related to an SRS of each user equipment has been configured at a higher layer, and the base station sends related configuration information to each user equipment by means of higher layer signaling (for example, RRC signaling). The parameter comprises but is not limited to: an SRS cycle shift (Cycle Shift, CS), a bandwidth, a sending subframe location, and the like, and configurations for user equipments may be different. In the scheduling method in this embodiment of this application, the physical indication signal may be used only to trigger an SRS to be sent.

Optionally, information related to scheduling of an SRS of at least one user equipment is a particular pattern (pattern) of the physical indication signal, or is an indication field used to indicate "to send/not to send", for example, the field "10" indicates "to send", and "01" indicates "not to send". When obtaining the physical indication signal of this particular pattern by means of listening or parsing out that an indication field in the physical indication signal obtained by means of listening is "10", the at least one user equipment may send an SRS according to a known configuration parameter. For example, the base station pre-configures, by using a higher layer signaling message, that each user equipment sends, in last OFDM symbols of some subframes, an SRS, and a user equipment that obtains the physical indication signal of this particular pattern by means of listening may send, in a last OFDM symbol of, for example, a next subframe of a carrier on which the physical indication signal is located, an SRS.

Further, optionally, the information related to scheduling of the SRS of the at least one user equipment may comprise identity information of the at least one user equipment, to trigger the user equipment corresponding to the identity information to send an SRS, a user equipment that obtains the physical indication signal by means of listening and that recognizes identity information of the user equipment itself sends an SRS, and a user equipment that does not recognize identity information of the user equipment itself does not send an SRS.

Moreover, to reduce complexity of SRS scheduling information, and reduce and control overheads, in the method in this embodiment of this application, the at least one user equipment may be grouped. For example, the at least one user equipment may be grouped at least according to factors such as a location of each user equipment and a quantity of user equipments, or the at least one user equipment may be randomly grouped, a same SRS transmission resource is allocated to user equipments in a same group, and an SRS transmission resource allocated to each group may be allocated based on a subframe timing relationship. Group information and an SRS transmission resource allocated to each group may be similarly pre-configured for each user equipment by means of higher layer signaling. In this case, each user equipment may listen for only a physical indication signal in a subframe that is of each carrier and that corresponds to a group of the user equipment, to determine whether information related to scheduling of an SRS of the group of the user equipment (for example, listen in a previous subframe of an SRS sending subframe corresponding to the group of the user equipment) exists. In this implementation manner, the physical indication signal may comprise identity information of a group of the at least one user equipment. In response to identity information of a group of a user equipment that is comprised in a physical indication signal obtained by means of listening in a particular subframe, the user equipment may send, at a particular location of a next subframe, an SRS.

In each group, each user equipment may be scheduled according to, for example, an actual load status of the user equipment, a quantity of user equipments in a group, and a user transmission requirement, to send an SRS, some user equipments may send an SRS more frequently, and other user equipments may send an SRS less frequently. In this implementation manner, the physical indication signal may further comprise identity information of a user equipment in addition to the identity information of the group of the at least one user equipment. Alternatively, to further reduce and control overheads, an SRS sending location in a corresponding group may be pre-configured for each user equipment, the physical indication signal has only a particular pattern or comprises only an indication field used to indicate "to send/not to send an SRS", and each user equipment may further obtain by means of listening whether a physical indication signal exists at an SRS sending location that is in a subframe corresponding to a group of the user equipment and that corresponds to the user equipment itself, or send an SRS according to an indication field in a corresponding physical indication signal.

Moreover, to avoid that a channel resource is occupied by another system at an SRS sending moment, it may be pre-configured that a resource used to transmit an SRS is vacated. Specifically, before step S120, the method in this embodiment of this application may further comprise:

S112. At least according to possible scheduling statuses of the at least one user equipment and a target user equipment of the available carrier, determine a part in which a resource for scheduling the at least one user equipment to send the sounding reference signal overlaps in a time domain with a resource for scheduling the target user equipment to transmit data.

Because a transmission activity of each user equipment is scheduled by a base station, the base station has known a possible scheduling status of each user equipment, and a part in which a resource to be used by each user equipment to transmit other data conflicts or overlaps with a resource to be used by each user equipment to transmit an SRS, especially, overlap in a time domain may be determined according to a possible scheduling status of each user equipment.

S114. Send a scheduling instruction, wherein the scheduling instruction is used to indicate to the target user equipment the available carrier allocated to the target user equipment, and is further used to instruct the target user equipment to vacate a time-frequency resource of a preset length on the available carrier, wherein the overlapped part comprises the time-frequency resource of the preset length.

In other words, after a possible overlapped part is determined, when the scheduling instruction is sent to the target user equipment, the target user equipment may be instructed to vacate some resources on which a conflict may occur, to cause that another user equipment transmits an SRS.

For example, the base station configures, by using an RRC instruction, that a user equipment sends, in last OFDM symbols of some subframes, an SRS. When a scheduling instruction used to schedule a user equipment to transmit physical uplink shared channel (PUSCH) data is sent, the user equipment is notified to vacate a last OFDM symbol of a transmission subframe (for example, the fourth subframe after scheduling signaling).

In another possible implementation manner, according to strength of the physical indication signal, the information related to scheduling of the SRS of the at least one user equipment may further comprise configuration information related to the SRS of the at least one user equipment, wherein the configuration information comprise at least some transmission parameters related to the at least one user equipment. In this implementation manner, a user equipment may transmit an SRS according to the configuration information comprised in the physical indication signal, to cause that SRS transmission can be scheduled more flexibly. In this implementation manner, as described above, according to a requirement, the information related to scheduling of the SRS of the at least one user equipment further comprises: identity information of the at least one user equipment and/or identity information of a group of the at least one user equipment.

Figure 2:
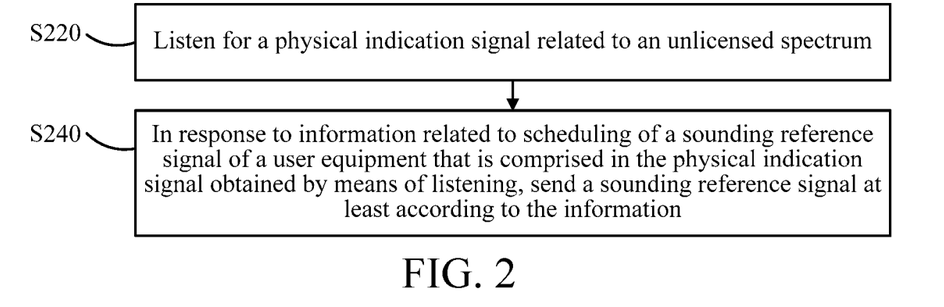
FIG. 2 is an exemplary flowchart of a method for a user equipment to send a sounding reference signal according to an embodiment of this application.

FIG. 2 is an exemplary flowchart of a method for a user equipment to send a sounding reference signal according to an embodiment of this application. The method may be executed by the user equipment. As shown in FIG. 2, the method comprises:

S220. Listen for a physical indication signal related to an unlicensed spectrum.

S240. In response to information related to scheduling of a sounding reference signal of a user equipment that is comprised in the physical indication signal obtained by means of listening, send a sounding reference signal at least according to the information, wherein the physical indication signal is used at least to trigger the at least one user equipment to send the sounding reference signal.

With reference to the description in FIG. 1, in a possible implementation manner, a transmission parameter related to an SRS of the user equipment has been configured at a higher layer, and the base station sends related configuration information to the user equipment by means of higher layer signaling. The parameter comprises but is not limited to: an SRS cycle shift, a bandwidth, a sending subframe location, and the like, and configurations for user equipments may be different. In the method in this embodiment of this application, the physical indication signal may be used only to trigger an SRS to be sent. In step S240, the user equipment sends the sounding reference signal at least according to the configuration information.

Optionally, information related to scheduling of an SRS of the user equipment is a particular pattern (pattern) of the physical indication signal, or is an indication field used to indicate "to send/not to send", for example, the field "10" indicates "to send", and "01" indicates "not to send". When obtaining the physical indication signal of this particular pattern by means of listening or parsing out that an indication field in the physical indication signal obtained by means of listening is "10", the user equipment may send an SRS according to a known configuration parameter. For example, the base station pre-configures, by using a higher layer signaling message, that the user equipment sends, in last OFDM symbols of some subframes, an SRS, and when the user equipment obtains the physical indication signal of this particular pattern by means of listening, the user equipment may send, in a last OFDM symbol of, for example, a next subframe of a carrier on which the physical indication signal is located, an SRS.

Further, optionally, the information related to scheduling of the SRS of the user equipment may comprise identity information of the user equipment. The user equipment may send an SRS when the user equipment obtains the physical indication signal by means of listening and recognizes identity information of the user equipment itself, and does not send an SRS when the user equipment does not recognize identity information of the user equipment itself.

Moreover, to reduce complexity of SRS scheduling information, and reduce and control overheads, in the method in this embodiment of this application, the user equipment may be grouped. For example, the user equipment may be grouped at least according to factors such as a location of the user equipment and a quantity of user equipments in a same cell, or the user equipment may be randomly grouped, a same SRS transmission resource is allocated to user equipments in a same group, and an SRS transmission resource allocated to a user equipment of each group may be allocated based on a subframe timing relationship. Group information and an SRS transmission resource allocated to each group may be similarly pre-configured for the user equipment by means of higher layer signaling. In this case, the user equipment may listen for only a physical indication signal in a subframe that is of each carrier and that corresponds to a group of the user equipment, to determine whether information related to scheduling of an SRS of the group of the user equipment (for example, listen in a previous subframe of an SRS sending subframe corresponding to the group of the user equipment) exists. In this implementation manner, the physical indication signal may comprise identity information of a group of the user equipment. In response to identity information of a group of the user equipment that is comprised in a physical indication signal obtained by means of listening in a particular subframe, the user equipment may send, at a particular location of a next subframe, an SRS.

Moreover, in each group, each user equipment may be scheduled according to, for example, an actual load status of the user equipment, a quantity of user equipments in a group, and a user transmission requirement, to send an SRS, some user equipments may send an SRS more frequently, and other user equipments may send an SRS less frequently. In this implementation manner, the physical indication signal may further comprise identity information of the user equipment in addition to the identity information of the group of the user equipment. Alternatively, to further reduce and control overheads, an SRS sending location in a corresponding group may be pre-configured for the user equipment, the physical indication signal has only a particular pattern or comprises only an indication field used to indicate "to send/not to send an SRS", and the user equipment may further obtain by means of listening whether a physical indication signal exists at an SRS sending location that is in a subframe corresponding to a group of the user equipment and that corresponds to the user equipment itself, or send an SRS according to an indication field in a corresponding physical indication signal, to reduce listening power consumption of the user equipment.

In another possible implementation manner, according to strength of the physical indication signal, the information related to scheduling of the SRS of the user equipment may further comprise configuration information related to the SRS of the user equipment, wherein the configuration information comprise at least some transmission parameters related to the user equipment. In this implementation manner, in step S240, an SRS may be transmitted according to the configuration information comprised in the physical indication signal, to cause that an SRS can be transmitted more flexibly. In this implementation manner, as described above, according to a requirement, the information related to scheduling of the SRS of the user equipment further comprises: identity information of the user equipment and/or identity information of a group of the user equipment. A person skilled in the art can understand that sequence numbers of the steps in the foregoing method in the specific implementation manners of this application do not mean execution sequences. The execution sequences of the steps should be determined according to functions and internal logic of the steps, and should not be construed as any limitation on the implementation processes of the specific implementation manners of this application.

In addition, an embodiment of this application further provides a computer readable medium, which comprises a computer readable instruction that performs the following operations when being executed: executing the operations of the steps of the method in the implementation manner shown in FIG. 1.

In addition, an embodiment of this application further provides a computer readable medium, which comprises a computer readable instruction that performs the following operations when being executed: executing the operations of the steps of the method in the implementation manner shown in FIG. 2.

Figure 3A:
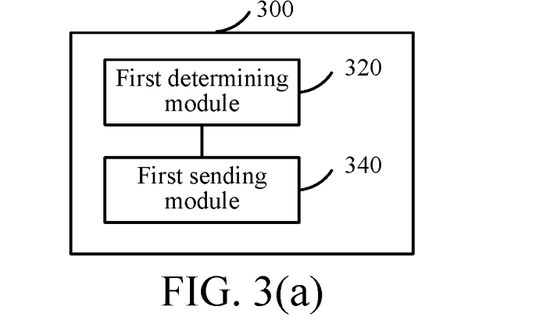

FIG. 3 (*a*) is an exemplary structural block diagram of a sounding reference signal scheduling apparatus according to an embodiment of this application. The apparatus may be or belong to any base station. As shown in FIG. 3 (*a*), a sounding reference signal scheduling apparatus 300 in this embodiment of this application comprises:

a first determining module 320, configured to determine an available carrier in an unlicensed spectrum; and a first sending module 340, configured to: in response to the existing available carrier, send, at least on the available carrier, a physical indication signal, wherein the physical indication signal comprises information related to scheduling of a sounding reference signal of at least one user equipment, and the physical indication signal is used at least to trigger the at least one user equipment to send the sounding reference signal.

In an LAA system, because an unlicensed spectrum is shared between multiple systems, to enable the systems to have an opportunity of fairly accessing the unlicensed spectrum, a traditional contention mechanism is usually used to determine use of the unlicensed spectrum. For example, for uplink scheduling in an LAA system, a common implementation method is: a base station first schedules some user equipments at a scheduling moment, determines, in scheduling signaling (UL Grant), information such as a time-frequency resource to be occupied by a user equipment and a transmission format, and instructs the user equipment to prepare for uplink transmission; after several frames, the base station determines a busy/idle channel status by means of, for example, clear channel assessment (Clear Channel Assessment, CCA), and when a channel is idle, the base station sends a physical indication signal of a particular type (for example, a reservation signal, Reservation Signal) to occupy the idle channel, and notifies the user equipment that the current channel is available. At a subsequent transmission moment, the user equipment performs uplink transmission according to the time-frequency resource and the transmission format that are previously indicated by the base station.

Usually, the physical indication signal is used only to occupy the available carrier, and may comprise no information, but in the scheduling apparatus in this embodiment of this application, the first sending module 340 places information related to scheduling of an SRS of at least one user equipment in the physical indication signal, wherein the physical indication signal is used at least to trigger the at least one user equipment to send an SRS.

Each user equipment in an LAA system may listen for, in a particular frequency band, a possible physical indication signal (for example, a reservation signal), and according to different configurations of an LAA system, the particular frequency band may be all frequency bands or some frequency bands of one or more carriers in an unlicensed spectrum, and may have been configured for the user equipment by using higher layer signaling (for example, RRC (Radio Resource Control, Radio Resource Control) signaling). In other words, in the scheduling apparatus of this embodiment, information related to SRS scheduling is placed in a physical indication signal, to cause that the physical indication signal can be received by multiple user equipments that listen for a corresponding carrier resource. Therefore, user equipments not only comprise user equipments to be scheduled to perform uplink transmission, but also comprise user equipments that have never been scheduled or have not been scheduled for a relatively long period, and in this way, the base station that performs SRS scheduling by using the apparatus in this embodiment can trigger at a time multiple user equipments to send SRSs to know channel states of these user equipments, that is, the apparatus in this embodiment of this application can perform SRS scheduling more flexibly.

In a possible implementation manner, a transmission parameter related to an SRS of each user equipment has been configured at a higher layer, and the base station sends related configuration information to each user equipment by means of higher layer signaling (for example, RRC signaling). The parameter comprises but is not limited to: an SRS cycle shift (Cycle Shift, CS), a bandwidth, a sending subframe location, and the like, and configurations for user equipments may be different. In the scheduling apparatus in this embodiment of this application, the physical indication signal may be used only to trigger an SRS to be sent.

Optionally, information related to scheduling of an SRS of at least one user equipment is a particular pattern (pattern) of the physical indication signal, or is an indication field used to indicate "to send/not to send", for example, the field "10" indicates "to send", and "01" indicates "not to send". When obtaining the physical indication signal of this particular pattern by means of listening or parsing out that an indication field in the physical indication signal obtained by means of listening is "10", the at least one user equipment may send an SRS according to a known configuration parameter. For example, the base station pre-configures, by using a higher layer signaling message, that each user equipment sends, in last OFDM symbols of some subframes, an SRS, and a user equipment that obtains the physical indication signal of this particular pattern by means of listening may send, in a last OFDM symbol of, for example, a next subframe of a carrier on which the physical indication signal is located, an SRS.

Further, optionally, the information related to scheduling of the SRS of the at least one user equipment may comprise identity information of the at least one user equipment, to trigger the user equipment corresponding to the identity information to send an SRS, a user equipment that obtains the physical indication signal by means of listening and that recognizes identity information of the user equipment itself may send an SRS, and a user equipment that does not recognize identity information of the user equipment itself does not send an SRS.

Moreover, to reduce complexity of SRS scheduling information, and reduce and control overheads, the scheduling apparatus in this embodiment of this application may group the at least one user equipment. For example, the at least one user equipment may be grouped at least according to factors such as a location of each user equipment and a quantity of user equipments, or the at least one user equipment may be randomly grouped, a same SRS transmission resource is allocated to user equipments in a same group, and an SRS transmission resource allocated to each group may be allocated based on a subframe timing relationship. Group information and an SRS transmission resource allocated to each group may be similarly pre-configured for each user equipment by means of higher layer signaling. In this case, each user equipment may listen for only a physical indication signal in a subframe that is of each carrier and that corresponds to a group of the user equipment, to determine whether information related to scheduling of an SRS of the group of the user equipment (for example, listen in a previous subframe of an SRS sending subframe corresponding to the group of the user equipment) exists. In this implementation manner, the physical indication signal may comprise identity information of a group of the at least one user equipment. In response to identity information of a group of a user equipment that is comprised in a physical indication signal obtained by means of listening in a particular subframe, the user equipment may send, at a particular location of a next subframe, an SRS.

In each group, each user equipment may be scheduled according to, for example, an actual load status of the user equipment, a quantity of user equipments in a group, and a user transmission requirement, to send an SRS, some user equipments may send an SRS more frequently, and other user equipments may send an SRS less frequently. In this implementation manner, the physical indication signal may further comprise identity information of a user equipment in addition to the identity information of the group of the at least one user equipment. Alternatively, to further reduce and control overheads, an SRS sending location in a corresponding group may be pre-configured for each user equipment, the physical indication signal has only a particular pattern or comprises only an indication field used to indicate "to send/not to send an SRS", and each user equipment may further obtain by means of listening whether a physical indication signal exists at an SRS sending location that is in a subframe corresponding to a group of the user equipment and that corresponds to the user equipment itself, or send an SRS according to an indication field in a corresponding physical indication signal.

Figure 3B:
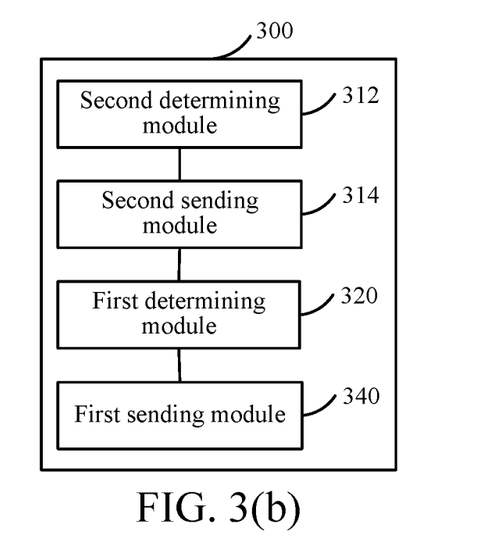

Moreover, to avoid that a channel resource is occupied by another system at an SRS sending moment, it may be pre-configured that a resource used to transmit an SRS is vacated. Specifically, as shown in FIG. 3(b), the apparatus 300 in this embodiment of this application may further comprise:

a second determining module 312, configured to: at least according to possible scheduling statuses of the at least one user equipment and a target user equipment of the available carrier, determining a part in which a resource for scheduling the at least one user equipment to send the sounding reference signal overlaps in a time domain with a resource for scheduling the target user equipment to transmit data; wherein because a transmission activity of each user equipment is scheduled by a base station, the base station has known a possible scheduling status of each user equipment, and the second determining module 312 may determine, according to a possible scheduling status of each user equipment, a part in which a resource to be used by each user equipment to transmit other data conflicts or overlaps with a resource to be used by each user equipment to transmit an SRS, especially, overlap in a time domain; and a second sending module 314, configured to send a scheduling instruction, wherein the scheduling instruction is used to indicate to the target user equipment the available carrier allocated to the target user equipment, and is further used to instruct the target user equipment to vacate a time-frequency resource of a preset length on the available carrier, wherein the overlapped part comprises the time-frequency resource of the preset length.

In other words, after a possible overlapped part is determined, when the second sending module 314 sends the scheduling instruction to the target user equipment, the target user equipment may be instructed to vacate some resources on which a conflict may occur, to cause that another user equipment transmits an SRS.

For example, the base station configures, by using an RRC instruction, that a user equipment sends, in last OFDM symbols of some subframes, an SRS. When a scheduling instruction used to schedule a user equipment to transmit physical uplink shared channel (PUSCH) data is sent, the user equipment is notified to vacate a last OFDM symbol of a transmission subframe (for example, the fourth subframe after scheduling signaling).

In another possible implementation manner, according to strength of the physical indication signal, the information related to scheduling of the SRS of the at least one user equipment may further comprise configuration information related to the SRS of the at least one user equipment, wherein the configuration information comprise at least some transmission parameters related to the at least one user equipment. In this implementation manner, the first sending module 340 may transmit an SRS according to the configuration information comprised in the physical indication signal, to cause that SRS transmission can be scheduled more flexibly. In this implementation manner, as described above, according to a requirement, the information related to scheduling of the SRS of the at least one user equipment further comprises: identity information of the at least one user equipment and/or identity information of a group of the at least one user equipment.

Figure 4:
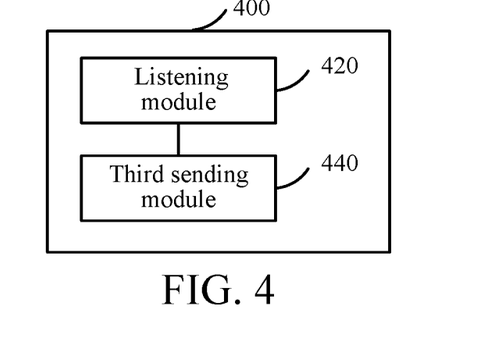
FIG. 4 is an exemplary structural block diagram of a method for a user equipment to send a sounding reference signal according to an embodiment of this application.

FIG. 4 is an exemplary structural block diagram of an apparatus for a user equipment to send a sounding reference signal according to an embodiment of this application. The apparatus may be or belong to a user equipment. As shown in FIG. 4, the apparatus 400 comprises:

a listening module 420, configured to listen for a physical indication signal related to an unlicensed spectrum; and a third sending module 440, configured to: in response to the information related to scheduling of the sounding reference signal of the user equipment that is comprised in the physical indication signal obtained by means of listening, sending a sounding reference signal at least according to the information, wherein the physical indication signal is used at least to trigger the at least one user equipment to send the sounding reference signal.

With reference to the description in FIG. 3 (a) and FIG. 3 (b), in a possible implementation manner, a transmission parameter related to an SRS of the user equipment has been configured at a higher layer, and the base station sends related configuration information to the user equipment by means of higher layer signaling. The parameter comprises but is not limited to: an SRS cycle shift, a bandwidth, a sending subframe location, and the like, and configurations for user equipments may be different. In the apparatus in this embodiment of this application, the physical indication signal may be used only to trigger an SRS to be sent. The third sending module 440 sends the sounding reference signal at least according to the known configuration information.

Optionally, information related to scheduling of an SRS of the user equipment is a particular pattern (pattern) of the physical indication signal, or is an indication field used to indicate "to send/not to send", for example, the field "10" indicates "to send", and "01" indicates "not to send". When the listening module 420 obtains the physical indication signal of this particular pattern by means of listening or parses out that an indication field in the physical indication signal obtained by means of listening is "10", the third sending module 440 may send an SRS according to a known configuration parameter. For example, the base station pre-configures, by using a higher layer signaling message, that the user equipment sends, in last OFDM symbols of some subframes, an SRS, and when the listening module 420 obtains the physical indication signal of this particular pattern by means of listening, the third sending module 440 may send, in a last OFDM symbol of, for example, a next subframe of a carrier on which the physical indication signal is located, an SRS.

Further, optionally, the information related to scheduling of the SRS of the user equipment may comprise identity information of the user equipment. The third sending module 440 may send an SRS when the listening module 420 obtains the physical indication signal by means of listening and recognizes identity information of the user equipment itself, and does not send an SRS when the listening module 420 does not recognize identity information of the user equipment itself.

Moreover, to reduce complexity of SRS scheduling information, and reduce and control overheads, the user equipment in this embodiment of this application may be a grouped user equipment. For example, the user equipment may be grouped at least according to factors such as a location of the user equipment and a quantity of user equipments in a same cell, or the user equipment may be randomly grouped, a same SRS transmission resource is allocated to user equipments in a same group, and an SRS transmission resource allocated to each group may be allocated based on a subframe timing relationship. Group information and an SRS transmission resource allocated to each group may be similarly pre-configured for the user equipment by means of higher layer signaling. In this case, the listening module 420 may listen for only a physical indication signal in a subframe that is of each carrier and that corresponds to a group of the user equipment, to determine whether information related to scheduling of an SRS of the group of the user equipment (for example, listen in a previous subframe of an SRS sending subframe corresponding to the group of the user equipment) exists. In this implementation manner, the physical indication signal comprises identity information of a group of the user equipment. In response to identity information of a group of the user equipment that is comprised in a physical indication signal obtained by means of listening in a particular subframe, the user equipment may send, at a particular location of a next subframe, an SRS.

Moreover, in each group, each user equipment in each group may be scheduled according to, for example, an actual load status of the user equipment, a quantity of user equipments in a group, and a user transmission requirement, to send an SRS, some user equipments may send an SRS more frequently, and other user equipments may send an SRS less frequently. In this implementation manner, the physical indication signal may further comprise identity information of the user equipment in addition to the identity information of the group of the user equipment. Alternatively, to further reduce and control overheads, an SRS sending location in a corresponding group may be pre-configured for the user equipment, the physical indication signal has only a particular pattern or comprises only an indication field used to indicate "to send/not to send an SRS", and the listening module 420 may further obtain by means of listening whether a physical indication signal exists at an SRS sending location that is in a subframe corresponding to a group of the user equipment and that corresponds to the user equipment itself, or an SRS is sent according to an indication field in a corresponding physical indication signal, to reduce listening power consumption of the user equipment.

In another possible implementation manner, according to strength of the physical indication signal, the information related to scheduling of the SRS of the user equipment may further comprise configuration information related to the SRS of the user equipment, wherein the configuration information comprise at least some transmission parameters related to the user equipment. In this implementation manner, the third sending module 440 may transmit an SRS according to the configuration information comprised in the physical indication signal, to cause that an SRS can be transmitted more flexibly. In this implementation manner, as described above, according to a requirement, the information related to scheduling of the SRS of the user equipment further comprises: identity information of the user equipment and/or identity information of a group of the user equipment.

Figure 5:
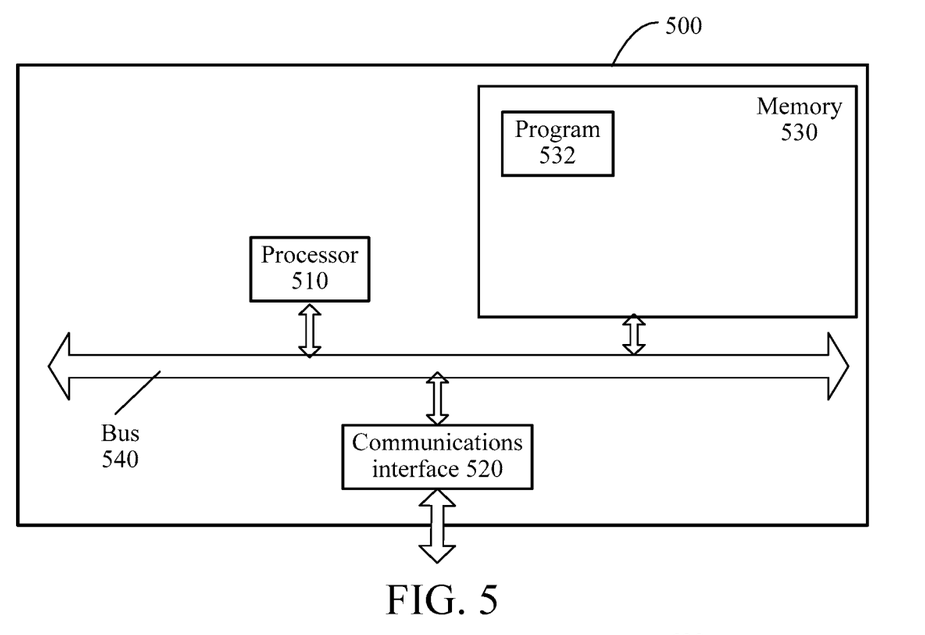
FIG. 5 is another exemplary structural block diagram of a sounding reference signal scheduling apparatus according to an embodiment of this application.

FIG. 5 is another exemplary structural block diagram of a sounding reference signal scheduling apparatus according to an embodiment of this application. This specific embodiment of this application does not limit specific implementation of the sounding reference signal scheduling apparatus. As shown in FIG. 5, the sounding reference signal scheduling apparatus 500 may comprise:

a processor (processor) 510, a communications interface (Communications Interface) 520, a memory (memory) 530, and a communications bus 540.

The processor 510, the communications interface 520, and the memory 530 communicate with each other by using the communications bus 540.

The communications interface 520 is configured to communicate with a network element, for example, a client.

The processor 510 is configured to execute a program 532, and specifically may execute related steps in the method embodiment shown in FIG. 1.

Specifically, the program 532 may comprise program code, and the program code comprises a computer operation instruction.

The processor 510 may be a central processing unit CPU, an application specific integrated circuit ASIC (Application Specific Integrated Circuit), or one or more integrated circuits configured to implement the embodiments of this application.

The memory 530 is configured to store the program 532. The memory 530 may comprise a high-speed RAM memory, and may also comprise a non-volatile memory (non-volatile memory), for example, at least one magnetic disk storage. The program 532 may be specifically used to enable the sounding reference signal scheduling apparatus 500 to perform the following steps:

determining an available carrier in an unlicensed spectrum; and in response to the existing available carrier, sending, at least on the available carrier, a physical indication signal, wherein the physical indication signal comprises information related to scheduling of a sounding reference signal of at least one user equipment, and the physical indication signal is used at least to trigger the at least one user equipment to send the sounding reference signal.

For specific implementation of the steps in the program 532, reference may be made to corresponding descriptions of corresponding steps and units in the foregoing embodiments, and details are not described herein. It may be clearly understood by a person skilled in the art that, for the purpose of a convenient and brief description, reference may be made to corresponding process descriptions in the foregoing method embodiment for specific working processes of the foregoing devices and modules, which are not described herein again.

It may be clearly understood by a person skilled in the art that, for the purpose of a convenient and brief description, for specific working processes of the foregoing devices and modules, reference may be made to corresponding descriptions in the foregoing apparatus embodiments, and details are not described herein again.

Figure 6:
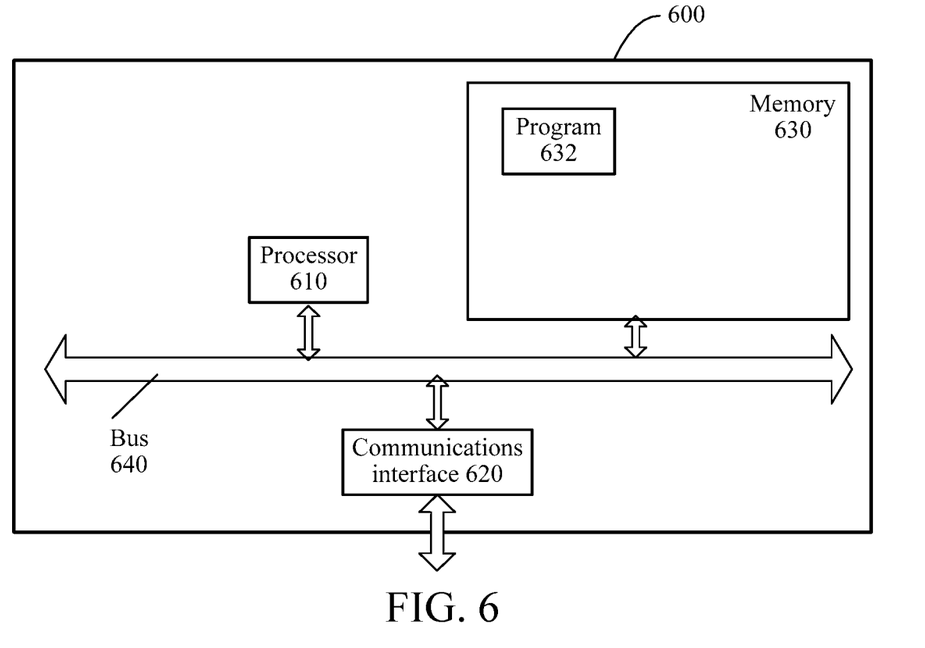
FIG. 6 is another exemplary structural block diagram of an apparatus for a user equipment to send a sounding reference signal according to an embodiment of this application.

FIG. 6 is another exemplary structural block diagram of an apparatus for a user equipment to send a sounding reference signal according to an embodiment of this application. This specific embodiment of this application does not limit specific implementation of the apparatus for sending a sounding reference signal. As shown in FIG. 6, the apparatus 600 for sending a sounding reference signal may comprise:

a processor (processor) 610, a communications interface (Communications Interface) 620, a memory (memory) 630, and a communications bus 640.

The processor 610, the communications interface 620, and the memory 630 communicate with each other by using the communications bus 640.

The communications interface 620 is configured to communicate with a network element, for example, a client.

The processor 610 is configured to execute a program 632, and specifically may execute related steps in the method embodiment shown in FIG. 2.

Specifically, the program 632 may comprise program code, and the program code comprises a computer operation instruction.

The processor 610 may be a central processing unit CPU, an application specific integrated circuit ASIC (Application Specific Integrated Circuit), or one or more integrated circuits configured to implement the embodiments of this application.

The memory 630 is configured to store the program 632. The memory 630 may comprise a high-speed RAM memory, and may also comprise a non-volatile memory (non-volatile memory), for example, at least one magnetic disk storage. The program 632 may be specifically used to enable the apparatus 600 for sending a sounding reference signal, to perform the following steps:

listening for a physical indication signal related to an unlicensed spectrum; and in response to the information related to scheduling of the sounding reference signal of the user equipment that is comprised in the physical indication signal obtained by means of listening, sending a sounding reference signal at least according to the information, wherein the physical indication signal is used at least to trigger the user equipment to send the sounding reference signal.

For specific implementation of the steps in the program 632, reference may be made to corresponding descriptions of corresponding steps and units in the foregoing embodiments, and details are not described herein. It may be clearly understood by a person skilled in the art that, for the purpose of a convenient and brief description, reference may be made to corresponding process descriptions in the foregoing method embodiment for specific working processes of the foregoing devices and modules, which are not described herein again.

It may be clearly understood by a person skilled in the art that, for the purpose of a convenient and brief description, for specific working processes of the foregoing devices and modules, reference may be made to corresponding descriptions in the foregoing apparatus embodiments, and details are not described herein again.

Although the subject described herein is provided in a general context with reference to that an operating system and an application program are executed in a computer system, a person skilled in the art may know that other implementation may further be executed with reference to a program module of another type. Generally, the program unit comprises a routine, a program, a component, a data structure, and a structure of another type for executing a particular task or implementing a particular abstract data type. A person skilled in the art may understand that the subject described herein may be practiced by using another configuration of a computer system, comprising a handheld device, a multi-processor system, a microprocessor-based or programmable consumer electronic product, a small computer, a mainframe computer, and the like, and may also be used in a distributed computing environment in which a task is fulfilled by a remote processing device connected by using a communications network. In a distributed computing environment, a program module may be located in either storage device of a local memory and a remote memory.

A person of ordinary skill in the art may be aware that, the exemplary units and method steps described in the embodiments disclosed in this specification may be implemented by electronic hardware, or a combination of computer software and the electronic hardware. Whether the functions are performed by hardware or software depends on particular applications and design constraint conditions of the technical solutions. A person skilled in the art may use different methods to implement the described functions for each particular application, but the implementation should not be construed as exceeding the scope of the present application.

When the functions are implemented in a form of a software functional unit, and are sold or used as an independent product, the functions may be stored in a computer readable storage medium. Based on such an understanding, the technical solutions of this application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the method described in the embodiment of this application. The computer readable storage medium comprises physically volatile and non-volatile mediums and removable and irremovable mediums that are used to store information such as a computer readable instruction, a data structure, a program module, or other data and that are implemented by using any method or technology. The computer readable storage medium specifically comprises but is not limited to a USB flash drive, a removable hard disk, a read-only memory (ROM, Read-Only Memory), a random access memory (RAM, Random Access Memory), an erasable programmable read-only memory (EPROM), an electrically erasable programmable read-only memory (EEPROM), a flash memory or another solid-state storage technology, a CD-ROM, a digital versatile disc (DVD), an HD-DVD, a blu-ray (Blue-Ray) or another optical storage device, a magnetic tape, magnetic disk storage or other magnetic storage devices, or any other mediums that can be configured to store required information and that are accessible to a computer.

The foregoing implementation manners are only used for describing the present invention, and are not intended to limit the present invention. A person of ordinary skill in the art may make various changes and variations without departing from the spirit and scope of the present invention; therefore, any equivalent technical solution falls within the scope of the present invention, and patent protection scope of the present invention shall be defined by claims.

What is claimed is:

1. A sounding reference signal scheduling method, comprising:
    sending a UL grant to a user equipment;
    after sending the UL grant, determining an available carrier in an unlicensed spectrum; and
    sending, on the available carrier, a reservation signal including scheduling of a sounding reference signal of at least one user equipment to occupy the available carrier, wherein the scheduling of the sound reference signal informs the user equipment of the available carrier and is configured at least to trigger the at least one user equipment to send the sounding reference signal on the available carrier;
    wherein the scheduling of the sounding reference signal indicates: configuration information of the sounding reference signal of the at least one user equipment, the configuration information comprising a sending sub-frame location that pre-configures the user equipment to send, in a last OFDM symbol of a next subframe of a carrier on which the reservation signal is located, an SRS;
    wherein, before the determining an available carrier in an unlicensed spectrum, the method further comprises:
    at least according to possible scheduling statuses of the at least one user equipment and a target user equipment of the available carrier, determining a part in which a resource for scheduling the at least one user equipment to send the sounding reference signal overlaps in a time domain with a resource for scheduling the target user equipment to transmit data,
    wherein a scheduling instruction is used to indicate to the target user equipment the available carrier allocated to the target user equipment, and is further used to instruct the target user equipment to vacate a time-frequency resource of a preset length on the available carrier, and wherein the overlapped part comprises the time-frequency resource of the preset length.

2. The method of claim 1, wherein the scheduling of the sounding reference signal further indicates:
    identity information related to the at least one user equipment.

3. The method of claim 2, wherein the identity information comprises identity information of a group of the at least one user equipment.

4. The method of claim 1, wherein the determining an available carrier in an unlicensed spectrum comprises:
    determining the available carrier by performing clear channel assessment on the unlicensed spectrum.

5. A sounding reference signal scheduling apparatus, comprising:
    a transceiver;
    a memory, configured to store an instruction; and
    a processor, configured to execute the instruction stored by the memory, wherein the instruction enables the processor to perform operations including:
    sending a UL grant to a user equipment;
    after sending the UL grant, determining an available carrier in an unlicensed spectrum; and
    sending, on the available carrier, a reservation signal including scheduling of a sounding reference signal of at least one user equipment to occupy the available carrier, wherein the scheduling of the sound reference signal informs the user equipment of the available carrier, and is configured at least to trigger the at least one user equipment to send the sounding reference signal on the available carrier;
    wherein the scheduling of the sounding reference signal indicates: configuration information of the sounding reference signal of the at least one user equipment, the configuration information comprising a sending sub-frame location that pre-configures the user equipment to send, in a last OFDM symbol of a next subframe of a carrier on which the reservation signal is located, an SRS;
    wherein the operations further comprise:
    at least according to possible scheduling statuses of the at least one user equipment and a target user equipment of the available carrier, determining a part in which a resource for scheduling the at least one user equipment to send the sounding reference signal overlaps in a time domain with a resource for scheduling the target user equipment to transmit data,
    wherein a scheduling instruction is used to indicate to the target user equipment the available carrier allocated to the target user equipment, and is further used to instruct the target user equipment to vacate a time-frequency resource of a preset length on the available carrier, and wherein the overlapped part comprises the time-frequency resource of the preset length.

6. The apparatus of claim 5, wherein the determining the available carrier is performed by clear channel assessment on the unlicensed spectrum.

\* \* \* \* \*